(12) United States Patent
Agostini et al.

(10) Patent No.: US 7,694,707 B2
(45) Date of Patent: Apr. 13, 2010

(54) TIRE WITH INTEGRAL FOAMED NOISE DAMPER

(75) Inventors: Giorgio Agostini, Colmar-Berg (LU); Jan Leyssens, Leglise-Beheme (BE)

(73) Assignee: The Goodyear Tire & Rubber Company, Akron, OH (US)

(*) Notice: Subject to any disclaimer, the term of this patent is extended or adjusted under 35 U.S.C. 154(b) by 694 days.

(21) Appl. No.: 11/583,422

(22) Filed: Oct. 19, 2006

(65) Prior Publication Data

US 2007/0137752 A1   Jun. 21, 2007

Related U.S. Application Data

(60) Provisional application No. 60/752,772, filed on Dec. 20, 2005.

(51) Int. Cl.
*B60C 5/14* (2006.01)
*B60C 5/00* (2006.01)
*B60C 19/00* (2006.01)

(52) U.S. Cl. ........................... 152/510; 152/450
(58) Field of Classification Search ............. 152/450, 152/510
See application file for complete search history.

(56) References Cited

U.S. PATENT DOCUMENTS

| | | | |
|---|---|---|---|
| 3,143,155 A | 8/1964 | Knox | |
| 3,170,195 A | 2/1965 | Knox | |
| 3,948,304 A | 4/1976 | Mirtain | |
| 3,970,416 A | 7/1976 | Mattson | |
| 3,989,429 A | 11/1976 | Mattson | |
| 4,163,467 A | 8/1979 | Dobson | |
| 4,282,052 A | 8/1981 | Dobson | |
| 5,234,647 A | 8/1993 | Harada et al. | |
| 6,390,164 B1 | 5/2002 | Beers | |
| 6,726,289 B2 | 4/2004 | Yukawa et al. | |
| 6,755,483 B2 | 6/2004 | Yukawa et al. | |
| 7,182,114 B2 | 2/2007 | Yukawa | |
| 7,195,683 B2 | 3/2007 | Naito et al. | |
| 2005/0275277 A1* | 12/2005 | Yukawa | |

FOREIGN PATENT DOCUMENTS

| | | | |
|---|---|---|---|
| DE | 3042350 A1 | 5/1982 | |
| DE | 19750229 A1 | 2/1999 | |
| DE | 19806935 A1 | 9/1999 | |

(Continued)

OTHER PUBLICATIONS

English machine translation of DE 30 42 350 A1, May 27, 1982.*

(Continued)

*Primary Examiner*—Adrienne C Johnstone
(74) *Attorney, Agent, or Firm*—John D. DeLong (57) ABSTRACT

The present invention is directed to a pneumatic tire having two spaced inextensible beads; a ground contacting tread portion; a pair of individual sidewalls extending radially inward from the axial outer edges of said tread portion to join the respective beads, the axial outer edges of the tread portion defining a tread width; a supporting carcass for the tread portion and sidewalls; and at least one foamed structure disposed radially inwardly of the carcass and exposed to the inner cavity of the tire, the foamed structure including a co-vulcanized foamed rubber composition having a density ranging from 0.1 to 1 g/cm³.

20 Claims, 6 Drawing Sheets

FOREIGN PATENT DOCUMENTS

| | | |
|---|---|---|
| EP | 0367556 A2 | 9/1990 |
| EP | 1676722 A1 | 5/2006 |
| JP | 6040206 | 2/1994 |
| JP | 2005104314 A * | 4/2005 |

OTHER PUBLICATIONS

English machine translation of DE 198 06 935 A1, Sep. 9, 1999.*
European Search Report dated Mar. 13, 2008.
Patent Abstracts of Japan 06040206, Feb. 15, 1994.

* cited by examiner

TIRE WITH INTEGRAL FOAMED NOISE DAMPER

CROSS REFERENCE TO OTHER APPLICATIONS

This application claims the benefit of Ser. No. 60/752,772 filed Dec. 20, 2005.

BACKGROUND OF THE INVENTION

Government regulations and consumer preferences continue to compel a reduction in the acceptable noise levels produced from the tires of passenger vehicles. One source of road noise is resonance within the air chamber enclosed by the innermost surface of the tire and the rim. One type of effort to reduce tire noise is damping the sound from the air vibration in the air chamber, which efforts have focused mainly on altering the innermost surface of the tire adjacent the tire carcass. Shortcomings in these previous efforts, as well as new stricter regulations regarding noise reduction, have provided a need for further improvements to the tire to reduce sound transmission due to vibrations within the air chamber.

SUMMARY OF THE INVENTION

The present invention is directed to a pneumatic tire comprising two spaced inextensible beads; a ground contacting tread portion; a pair of individual sidewalls extending radially inward from the axial outer edges of said tread portion to join the respective beads, the axial outer edges of the tread portion defining a tread width; a supporting carcass for the tread portion and sidewalls; and at least one foamed structure disposed radially inwardly of the carcass and exposed to the inner cavity of the tire, the foamed structure comprising a co-vulcanized foamed rubber composition having a density ranging from 0.1 to 1 g/cm$^3$.

BRIEF DESCRIPTION OF THE DRAWINGS

The invention will be more readily understood with respect to the accompanying drawings wherein.

DESCRIPTION OF THE INVENTION

In accordance with the present invention, there is provided a pneumatic tire comprising two spaced inextensible beads; a ground contacting tread portion; a pair of individual sidewalls extending radially inward from the axial outer edges of said tread portion to join the respective beads, the axial outer edges of the tread portion defining a tread width; a supporting carcass for the tread portion and sidewalls; and at least one foamed structure disposed radially inwardly of the carcass and exposed to the inner cavity of the tire, the foamed structure comprising a co-vulcanized foamed rubber composition having a density ranging from 0.1 to 1 g/cm$^3$.

The integral foamed structure can be disposed in various inner portions of the tire. For example it can extend from bead to bead for protection of both the tread and sidewall portions of the tire or it can simply be selectively and locally disposed on the inner surface of the tire.

The foamed structure is co-vulcanized with the tire in order to be integral with the dynamic tire construction. It is built as a solid unvulcanized layer containing a heat activatable blowing agent onto the inner portion of the green, unvulcanized tire over a building form and then shaped, molded and heated under pressure to simultaneously co-vulcanize therewith. The pressure is generally supplied by a shaping bladder positioned within the tire to press and shape it outwardly against a mold. The foamed structure is formed by heat activating the blowing agent during the vulcanization process to simultaneously expand said adherent solid layer. Typical vulcanization temperatures range from about 90° C. to about 200° C. Thus, the foamed structure is formed substantially simultaneously with the co-vulcanization step in order to enhance the integral tire construction. The foamed structure itself is therefore integral with the tire construction, instead of being a simple laminate that is glued or otherwise attached to a previously cured tire.

The integral foamed structure of the tire is of such a gauge as to not occupy any substantial inner portion of the inflated tire. Generally, its thickness ranges from about 1 to about 80 and preferably about 10 to about 50 percent of the total tire thickness, depending somewhat upon the tire size and intended use of the tire with its structured volume being less than about 25 percent, preferably less than about 10 percent, of the encompassed volume of air in the pneumatic tire. Thus, a typical thickness is in the range of about 10 to about 30 percent of the total tire thickness for an ordinary passenger pneumatic tire with its volume being less than about 10 percent of the encompassed volume of air in the pneumatic tire.

In order to obtain an adequate noise dampening effect by the foamed structure in the tire, the foamed structure has a density or density and porosity in ranges suitable to dampen noise.

In one embodiment, the foamed structure has a density ranging from about 0.1 to about 1 g/cm$^3$. This density is for the foamed, fully loaded compound, including elastomers and additives such as carbon black, silica, zinc oxide, curatives and oils. In another embodiment, the foamed structure has a density ranging from about 0.2 to about 0.9 g/cm$^3$. In another embodiment, the foamed structure has a density ranging from about 0.2 to about 0.8 g/cm$^3$.

In one embodiment, the foamed structure has a porosity ranging from about 20 to about 80 percent by volume. In another embodiment, the foamed structure has a porosity ranging from about 30 to about 70 percent by volume. As defined in the present invention, porosity is the fraction of the total volume of the foamed structure not occupied by the rubber compound. In other words, the porosity is the volume fraction of the foamed structure occupied by void space in the pores and cells formed by the foaming agent.

The foamed structure is foamed with a blowing agent. The blowing agents used in the practice of this invention for the manufacture of the pneumatic tire are those which liberate gases upon heating. Representative examples of such agents are those which liberate gases such as nitrogen or carbon dioxide and cause the formation of the integral closed cell internal layer. Usually agents which liberate nitrogen are preferred. Such blowing agents are compounds which give off gases upon being triggered by the vulcanization temperatures, representative of which are nitro, sulfonyl and azo compounds such as dinitrosopentamethylene tetramine, N,N'-dimethyl-N,N'-dinitrosophthalamide, azodicarbonamide, sulfonyl hydrazides such as benzenesulfonyl hydrazide, toluenesulfonyl hydrazide and p,p'-oxy-bis-(benzenenesulfonyl)hydrazide and sulfonyl semicarbazides such as p-toluene sulfonyl semicarbazide and p,p'-oxy-bis-(benzenesulfonyl semicarbazide). Carbon dioxide may be given off by compounds such as ammonium bicarbonate and sodium bicarbonate.

In order to obtain the desired density and porosity in the foamed structure, the amount of blowing agent may vary. In one embodiment, the amount of blowing agent used in the rubber composition of the foamed structure ranges from about 5 to about 25 phr. In another embodiment, the amount of blowing agent ranges from about 10 to about 25 phr.

The vulcanized rubber tire and the co-vulcanized integral foamed structure can be of various cured or vulcanized rubbers such as natural rubber and synthetic rubber and their mixtures or blends. For example, they can be rubbery styrene-butadiene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene-diene terpolymers and polyurethane elastomers. Typically the various polymers are cured or vulcanized by normal curing methods and recipes such as with sulfur, or with peroxides in the case of the ethylene-propylene copolymers, or with primary diamines in the case of polyurethane elastomers. The sulfur cured or vulcanized natural rubber and synthetic rubbery polymers are preferred such as styrene-butadiene rubber, cis-1,4-polyisoprene, polybutadiene, butyl rubber, chlorobutyl rubber, and bromobutyl rubber.

It is readily understood by those having skill in the art that the rubber compositions used in the integral foamed structure would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The rubber compound may contain various conventional rubber additives. Typical additions of carbon black comprise about 20 to 200 parts by weight per 100 parts by weight of diene rubber (phr), preferably 50 to 100 phr.

A number of commercially available carbon blacks may be used. Included in the list of carbon blacks are those known under the ASTM designations N299, S315, N326, N330, M332, N339, N343, N347, N351, N358, N375, N539, N550 and N582. Processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 80 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in the *Vanderbilt Rubber Handbook* (1990), Pages 343 through 362. Typical amounts of antiozonants comprise about 1 to about 5 phr. Representative antiozonants may be, for example, those disclosed in the *Vanderbilt Rubber Handbook* (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 5 phr, or even, in some circumstances, up to about 8 phr, with a range of from about 3 to about 5 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators which is generally used in the larger amount (0.5 to 2.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods, which will be readily apparent to those having skill in such art. As noted previously herein, the foamed structure is co-vulcanized with the tire in order to be integral with the dynamic tire construction. It is built as a solid unvulcanized layer containing the heat activatable blowing agent onto the inner portion of the green, unvulcanized tire over a building form and then shaped, molded and heated under pressure to simultaneously co-vulcanize therewith. The pressure is generally supplied by a shaping bladder positioned within the tire to press and shape it outwardly against a mold. The foamed structure is formed by heat activating said blowing agent during the vulcanization process to simultaneously expand said adherent solid layer. Typical vulcanization temperatures range from about 90° C. to about 200° C. Thus, the foamed structure is formed substantially simultaneously with the co-vulcanization step in order to enhance the integral tire construction. To do this, an unshaped and unvulcanized tire is built around a tire building drum by first building over the drum an inner layer of rubber composition comprising the blowing agent and optionally a non-foamed innerliner. Over this initial layer of rubber the remainder of the tire is built including the lay-up of the rubberized fabric plies, bead portions, sidewall and tread. The fabricated tire is then removed from the building form and shaped, molded and vulcanized in the tire.

The inner layer of especially compounded rubber expands as the blowing agent is heat activated during the vulcanization process to form the foamed structure. However, this expansion is suppressed during the tire molding by the presence of the shaping bladder which presses against the interior of the tire owing to the significant pressure of the bladder. The pressure in the bladder is maintained higher than the pressure of the blowing agent being released in the foamed structure. Once the pressure in the bladder is released, the foamed structure is free to expand to its final conformation, which may include open and/or closed cells.

In one embodiment, the foamed structure includes a plurality of foamed projections. In one embodiment, the foamed projections result from a pattern impression in the foamed structure made by the patterned bladder used during molding. As is known in the art, tire bladders may have a textured, or patterned, surface to allow venting of gases during tire molding, as taught for example in U.S. Pat. No. 3,170,195. Surprisingly and unexpectedly, use of such a patterned bladder during molding to produce the tire having the foamed structure results in a foamed structure having a plurality of foamed projections resulting from the impressed pattern of the bladder. The foamed projection may in part resemble an inverse of the bladder surface texture or pattern, as the pattern has been impressed into the rubber compound. These foamed projections may assist in the dampening of noise in the tire.

The foamed structure having a plurality of foamed projections may also be obtained by methods other than use of a patterned bladder. In one embodiment, the solid unvulcanized layer containing the blowing agent may be pre-shaped to include surface features that subsequent to molding will form foamed projections. In one embodiment, the solid unvulcanized layer may be made as disclosed for example in U.S. Pat. Nos. 5,234,647 or 3,948,304 to impart a series of parallel raised ridges to one side of the sheet. The sheet is then placed on the tire building drum as previously described herein, with the raised ridges placed so as to be exposed to the bladder during cure. The raised ridges may form expanded, foamed projections upon release of the bladder pressure after tire molding.

Referring now to the drawings it is shown that a pneumatic rubber tire can be prepared by building an unshaped and unvulcanized basic tire 10 containing what are to become the customary tread portion 13, sidewalls 11 and carcass 12, which typically contains plies (not shown) to back and reinforce the tread and sidewall portions, and particularly a foamed structure 18 which contains a heat activatable blowing agent. The green tire is then placed in a mold where it is shaped, molded and heated under pressure to simultaneously co-vulcanize the tire and foamed structure and also activate the blowing agent.

Figure 1:
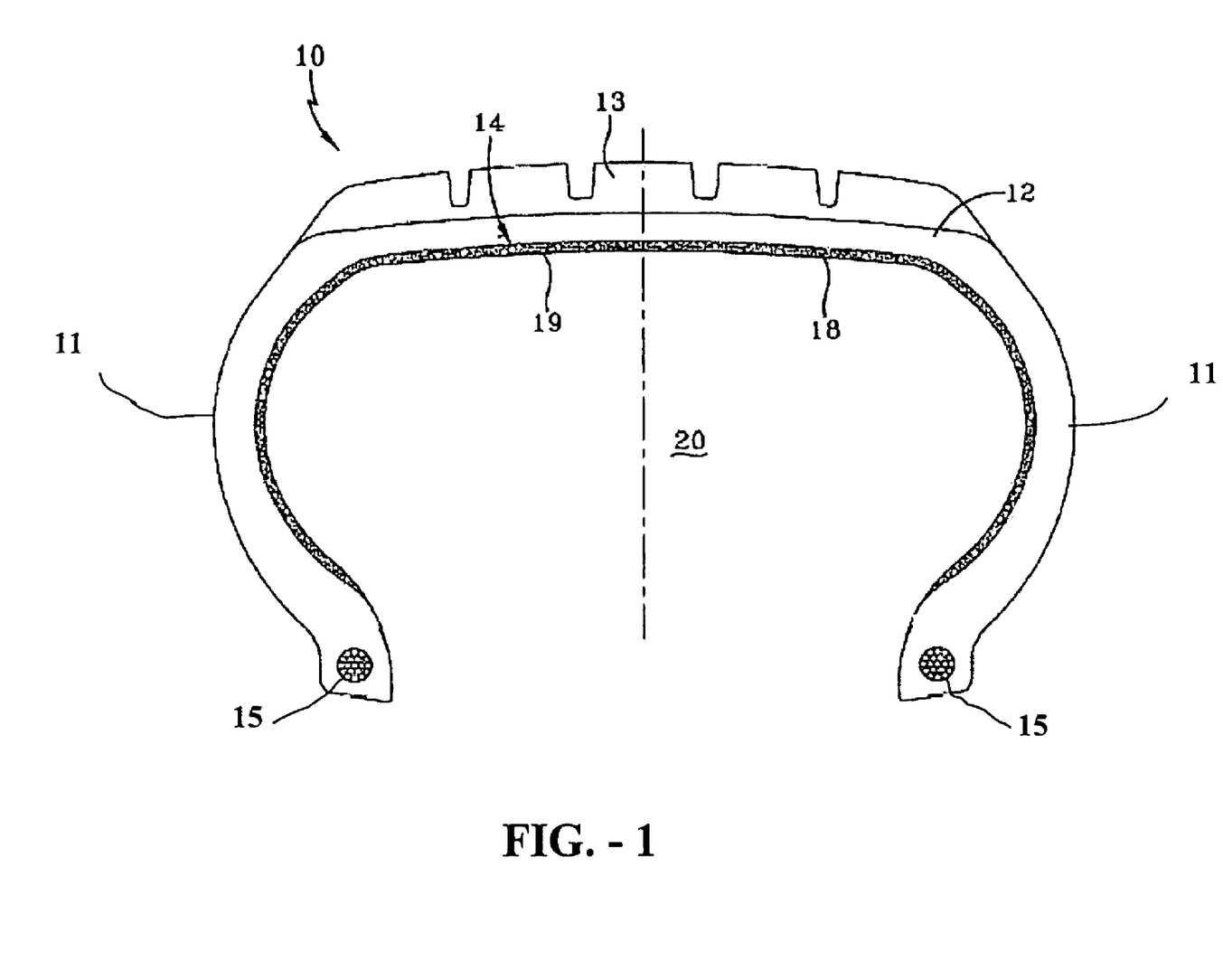
FIG. 1 is a cross-sectional view of one embodiment of a tire having a foamed structure according to the present invention.
Figure 2:
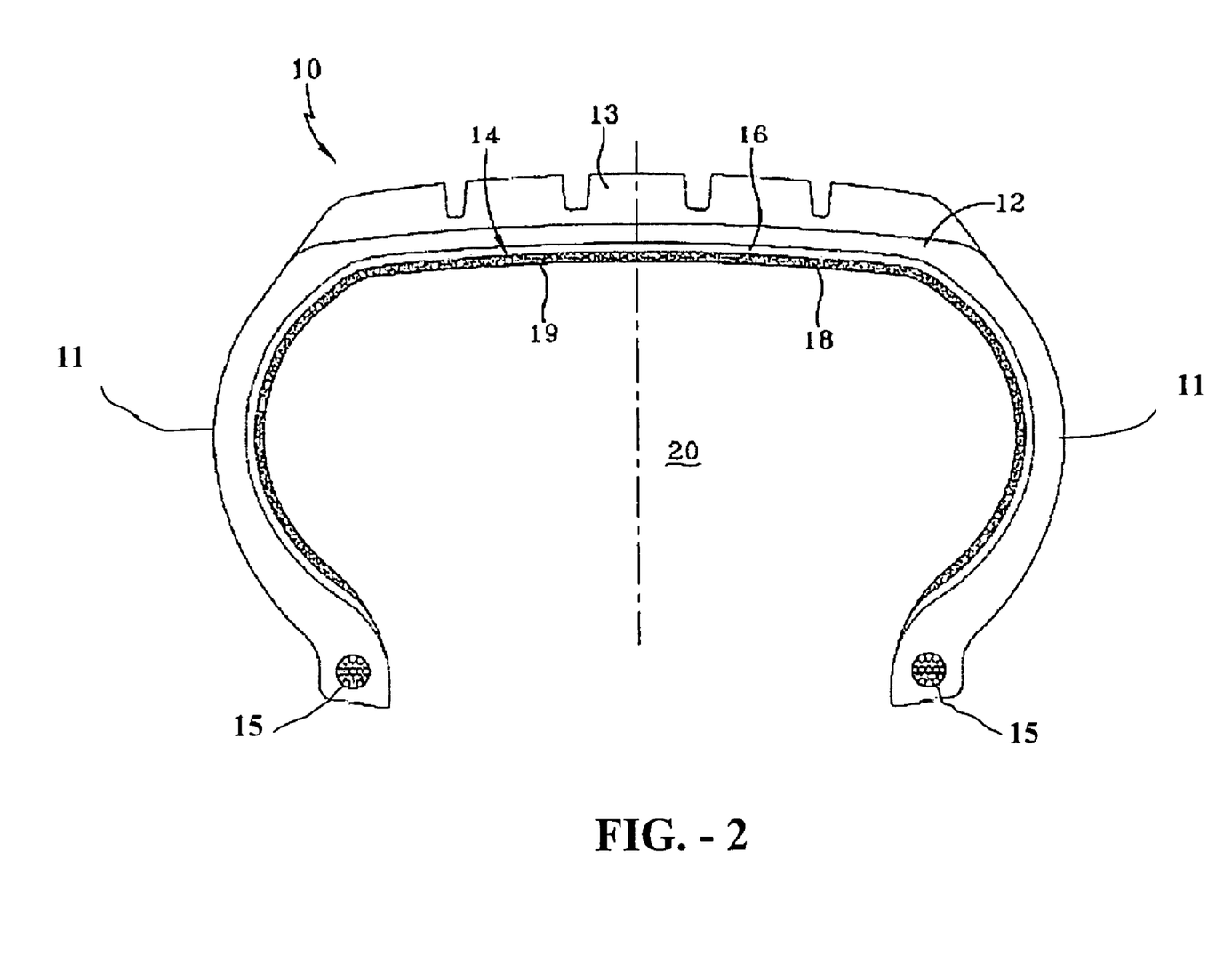
FIG. 2 is a cross-sectional view of another embodiment of a tire having a foamed structure according to the present invention.
Figure 3:
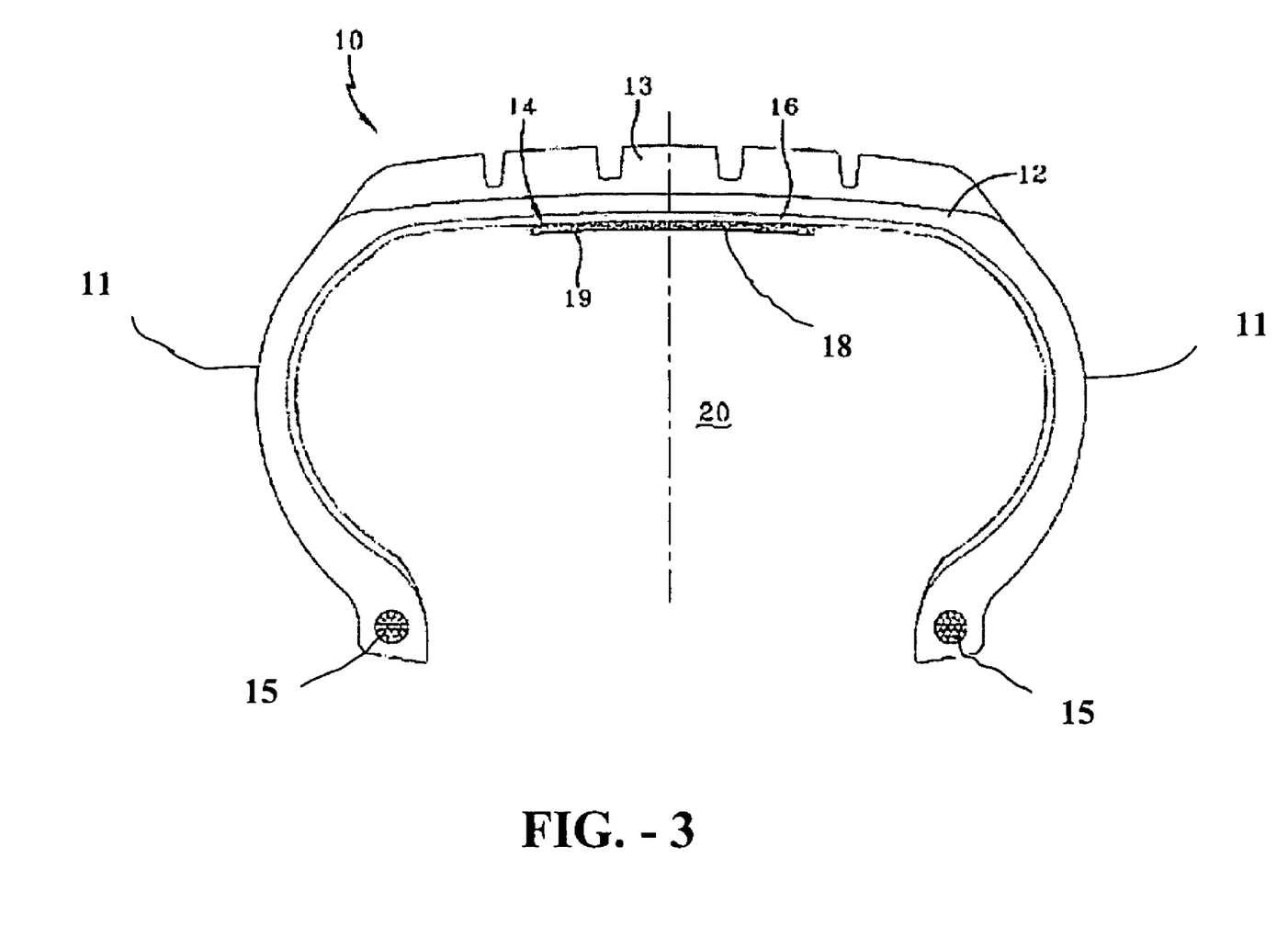
FIG. 3 is a cross-sectional view of another embodiment of a tire having a foamed structure according to the present invention.

FIG. 1 depicts in cross-section one embodiment of a tire 10 in accordance with the present invention. Tire 10 includes a carcass 12 having a tread 13 disposed on the outermost surface, which tread 13 is the portion of the tire 10 that contacts the ground during operation of the tire 10. As is known in the art, the carcass 12 may include one or more plies of cords (not shown) and the carcass wraps the bead portions 15 of the tire. A foamed structure 18 is disposed inside the carcass 12 with innermost surface 19 facing the air chamber 20, with the foamed structure 18 extending circumferentially and from bead 15 to bead 15. In the embodiment shown in FIG. 1, the foamed structure 18 may serve as an innerliner to prevent air migration from the air chamber 20 through the tire 10. In an alternative embodiment as shown in FIG. 2, the tire 10 includes innerliner layer 16 disposed adjacent the carcass 12 and foamed structure 18 disposed adjacent innerliner 16 and forming the innermost surface 19, with the foamed structure 18 extending circumferentially and from bead 15 to bead 15. In another alternative embodiment as shown in FIG. 3, the tire 10 includes innerliner layer 16 disposed adjacent the carcass 12 and foamed structure 18 disposed adjacent innerliner 16 and forming the innermost surface 19, with foamed structure 18 extending circumferentially and axially over less than the full width of the tread 13. In the embodiments shown in FIGS. 2 and 3, innerliner 16 is made of a non-foamed rubber and serves to prevent the air inside the air chamber 20 from escaping, thereby maintaining the air tightness of the tire 10.

Thus, in one embodiment the foamed structure may extend circumferentially about the inside of the tire and axially from bead to bead. In another embodiment, the foamed structure may extend circumferentially about the inside of the tire and only partially across the width of the tire. In one embodiment, the foamed structure may extend axially no more than 50 percent of the tread width. In another embodiment, the foamed structure may extend axially in a range of from about 10 percent to 50 percent of the tread width. In another embodiment, the foamed structure may be substantially centered axially on the axial centerline of the tire. In another embodiment, multiple circumferential foamed structures may be used, disposed so as to equalize the load on the tire and maintain dynamic balance.

Figure 4:
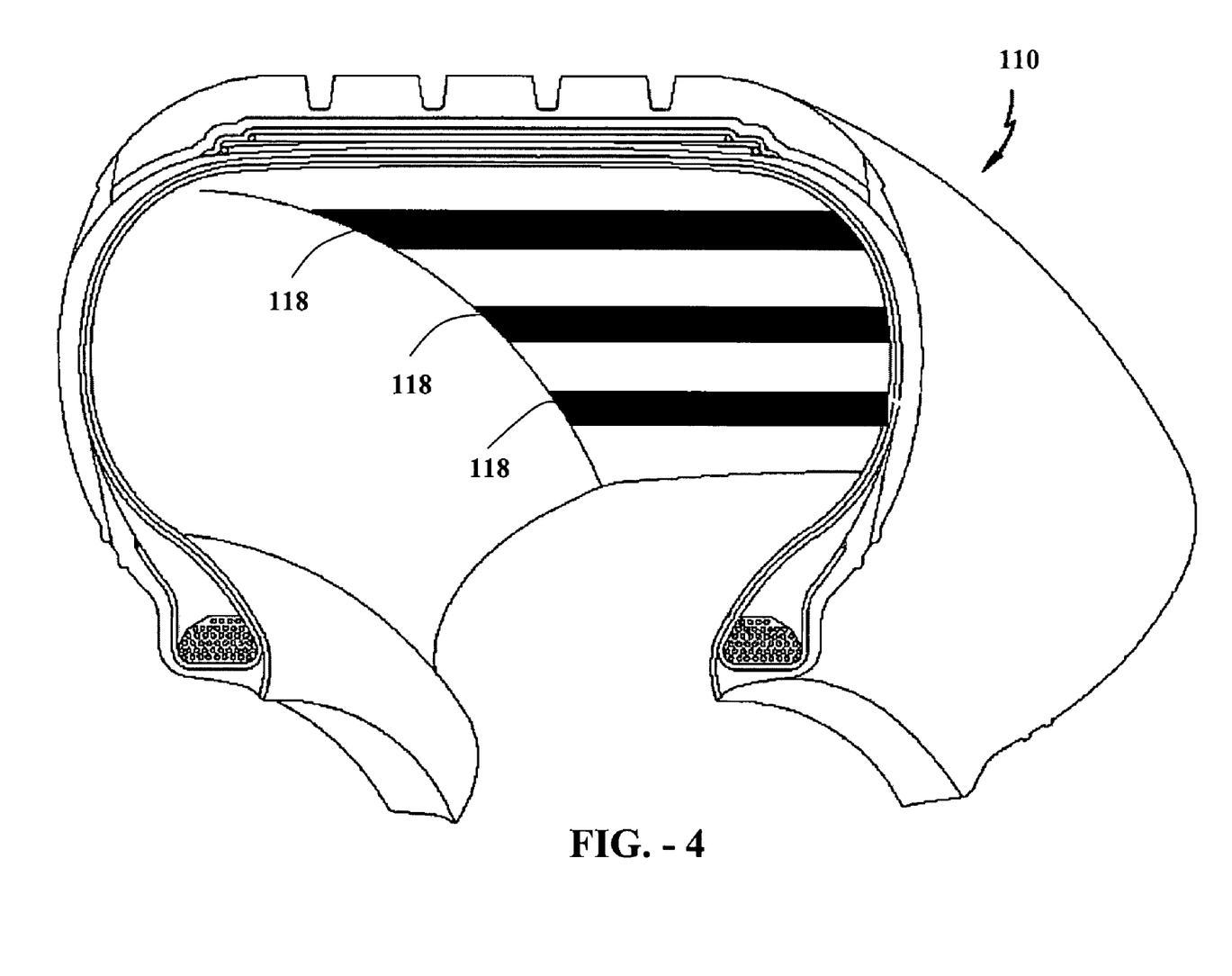
FIG. 4 is a perspective view of another embodiment of a tire having multiple foamed structures according to the present invention.

In another embodiment, the foamed structure may include a plurality of substantially equally and circumferentially spaced foamed structures disposed about the circumference of the tire. In this embodiment as shown in FIG. 4, foamed structures 118 may extend partially across the radius of the tire 110. Strips of nonfoamed compound (not shown) may be disposed between the foamed strips 118. In another embodiment, the foamed structures may extend bead to bead.

The practice of this invention is further illustrated by reference to the following examples which are intended to be representative rather than restrictive of the scope of the invention. Unless otherwise indicated, all parts and percentages are by weight.

EXAMPLE 1

In this example, the effect of varying amounts of blowing agent on the physical characteristics of a rubber compound is illustrated. A series of rubber compounds were prepared following the recipes shown in Table 1, with amounts given in parts by weight per 100 parts by weight of elastomer (phr). The compounds were then cured at 170° C. for 10 minutes. Porosity has been calculated from the density of the resulting compounds measured using the ASTM D297(2), DIN53479 method. The results are shown in Table 2.

TABLE 1

| | Sample No. | | | | |
|---|---|---|---|---|---|
| | 1 | 2 | 3 | 4 | 5 |
| Elastomer[1] | 100 | 100 | 100 | 100 | 100 |
| Filler[2] | 26 | 26 | 26 | 26 | 26 |
| Oil[3] | 10 | 10 | 10 | 10 | 10 |

TABLE 1-continued

| | Sample No. | | | | |
|---|---|---|---|---|---|
| | 1 | 2 | 3 | 4 | 5 |
| Zinc Oxide | 1 | 1 | 1 | 1 | 1 |
| Stearic Acid | 2 | 2 | 2 | 2 | 2 |
| Processing Aid[4] | 5.3 | 5.3 | 5.3 | 5.3 | 5.3 |
| Processing Aid[5] | 2 | 2 | 2 | 2 | 2 |
| Sulfur | 0.5 | 0.5 | 0.5 | 0.5 | 0.5 |
| Accelerators[6] | 1.24 | 1.24 | 1.24 | 1.24 | 1.24 |
| Blowing Agent[7] | 0 | 10 | 15 | 20 | 25 |

[1]Bromobutyl 2222 from Exxon Chemical
[2]Corax N660 from Degussa
[3]Flexon 641 from Exxon Chemical
[4]Koresin resin from Strucktol
[5]SP1068 from Schenectady International
[6]MBTS Vulkacit DM/C from Bayer
[7]Celogen OT from Crompton Corporation

TABLE 2

| | Sample No. | | | | |
|---|---|---|---|---|---|
| | 1 | 2 | 3 | 4 | 5 |
| Blowing Agent | 0 | 10 | 15 | 20 | 25 |
| Porosity, vol % | 00 | 39 | 58 | 70 | 76 |
| Density, g/cm$^3$ | 1.12 | 0.7 | 0.49 | 0.35 | 0.28 |

EXAMPLE 2

Figure 5:
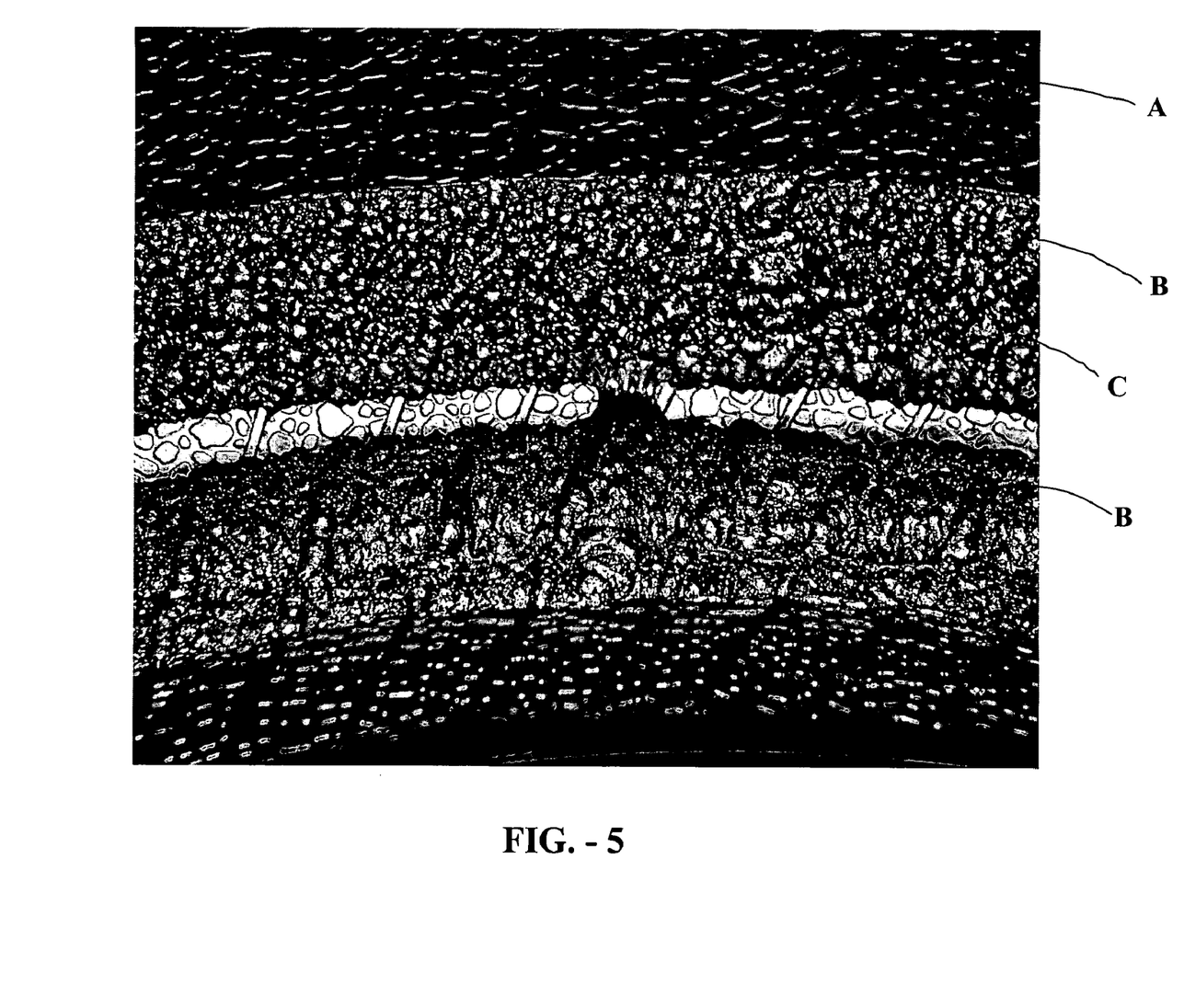
FIG. 5 is an enlarged view of a photograph showing a plurality of foamed projections in a tire having a foamed structure.

In this example, co-vulcanization of a porous structure on the inner surface of a tire is illustrated. A foamable rubber compound designated as Sample 6 was prepared having the composition shown in Table 3. Dual strips of the Sample 6 green rubber compound were then stitched circumferentially onto the inner surface of a 215/45R17 green tire followed by cure in a bladder-type tire mold for 20 min at 170° C. The bladder surface was of the "patio" texture type as is known in the art. After cure and release of the bladder pressure, it was observed that the rubber strip had foamed and the areas of the rubber strip impressed by the bladder design had formed into a plurality of foamed projections extending radially away from the inner surface of the tire. FIG. 5 shows the inner surface of the tire A with dual foamed structures B. As seen in FIG. 5, the bladder impressed a patio pattern (A) on the inner surface of the tire during cure. Upon release of the bladder pressure, the strip of foamable compound (B) expanded with projections (C) resulting from the impressed bladder pattern.

TABLE 3

| | Sample No. 6 |
|---|---|
| Elastomer* | 100 |
| Filler | 26 |
| Oil | 15 |
| Zinc Oxide | 1 |
| Stearic Acid | 2 |
| Processing Aid | 5.3 |
| Processing Aid | 2 |
| Sulfur | 0.5 |
| Accelerators | 1.24 |
| Blowing Agent | 15 |

*All components identified as in Table 1.

EXAMPLE 3

Figure 6:
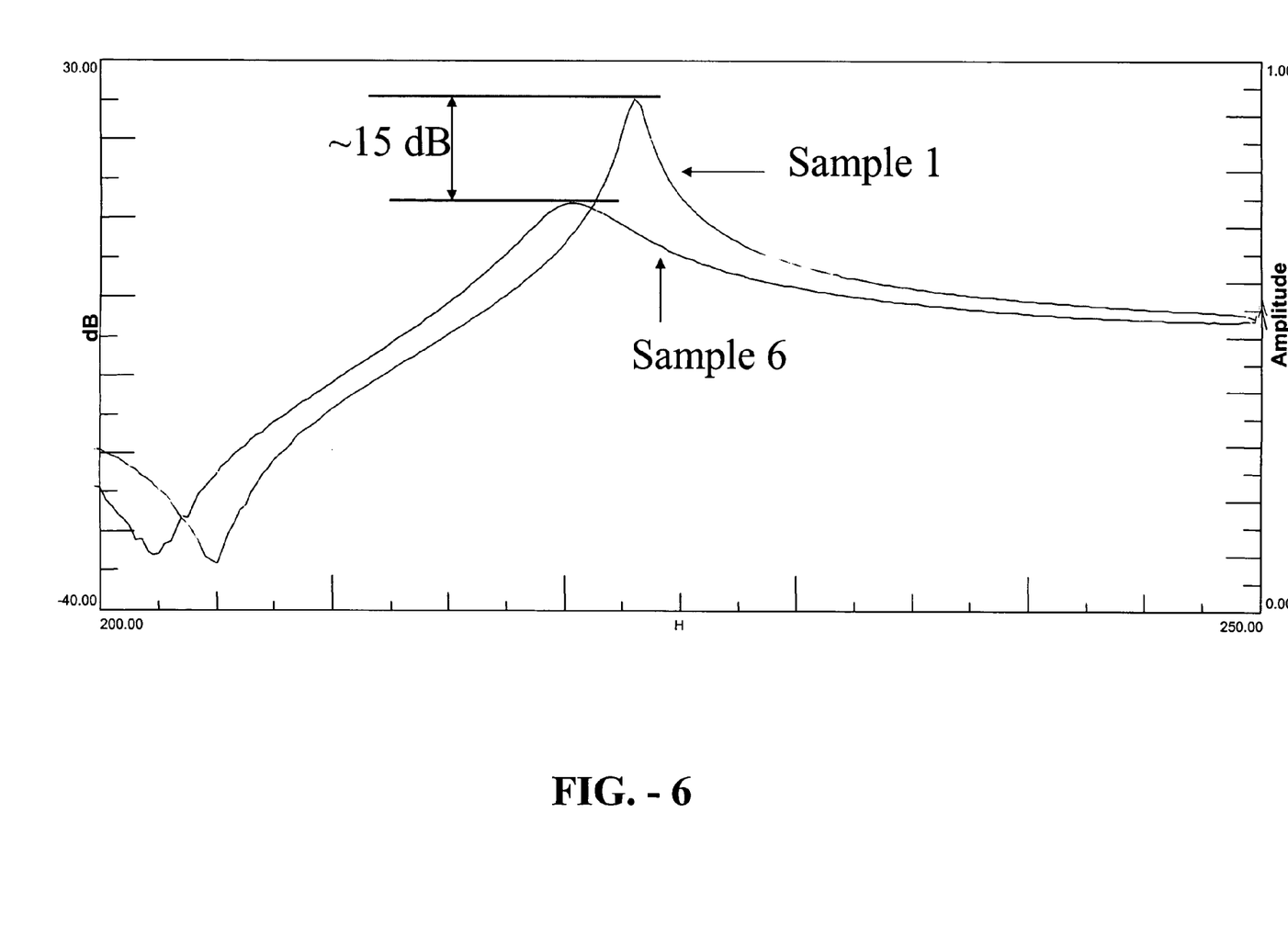
FIG. 6 is a graph showing the noise level generated during testing of a tire according to the invention.

In this example, the noise characteristic of a tire having a co-vulcanized foamed structure with a plurality of foamed projections is illustrated. A test tire with a foamable rubber strip was made using the compound of Sample 6, and a control tire was made with an innerliner using the compound of Sample 1. The tire of the invention was made using a single 5 cm by 180 cm strip of green Sample 6 rubber compound stitched circumferentially onto the inner surface of a 215/45R17 green tire followed by cure in a bladder-type tire mold for 20 min at 170° C. The tires were tested for tire force transmissibility by measuring the force generated at the hub for a unit force hammer impact on the tread surface. Typically, for a tire the response of force transmissibility vs frequency shows two distinct peaks, the so-called first vertical resonance at about 90 Hz and the tire cavity resonance at about 220 Hz. The response curve is shown in FIG. 6. Surprisingly and unexpectedly, the tire with the foamed structure with Sample 6 showed an approximately 15 dB decrease in the tire cavity resonance peak as compared with the control tire.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising two spaced inextensible beads; a ground contacting tread portion; a pair of individual sidewalls extending radially inward from the axial outer edges of said tread portion to join the respective beads, the axial outer edges of the tread portion defining a tread width; a supporting carcass for the tread portion and sidewalls; and at least one foamed noise damper structure disposed radially inwardly of the carcass and exposed to the inner cavity of the tire, the foamed noise damper structure comprising a co-vulcanized foamed rubber composition having a density ranging from greater than 0.3 to 1 g/cm$^3$.

2. The pneumatic tire of claim 1, wherein the at least one foamed noise damper structure has a density ranging from 0.35 to 1 g/cm$^3$.

3. The pneumatic tire of claim 2, wherein the at least one foamed noise damper structure further comprises an integral foamed structure extending circumferentially and radially inward from the carcass, and axially no more than 50 percent of the tread width.

4. The pneumatic tire of claim 2, wherein the at least one foamed noise damper structure extends axially in a range of from about 10 percent to 50 percent of the tread width.

5. The pneumatic tire of claim 2, wherein the at least one foamed noise damper structure is substantially centered axially on the axial centerline of the tire.

6. The pneumatic tire of claim 2, wherein the at least one foamed noise damper structure further comprises a plurality of foamed projections extending radially inward from the carcass.

7. The pneumatic tire of claim 2, wherein the at least one foamed noise damper structure further comprises a plurality of foamed projections extending radially inward from the carcass, the foamed projections selected from foamed rectangles, foamed cubes, foamed pyramids, foamed hemispheres, foamed cylinders, foamed cross hatching, foamed lettering, and foamed logos.

8. The pneumatic tire of claim 2, further comprising a co-vulcanized innerliner layer disposed between the carcass and the at least one foamed noise damper structure.

9. The pneumatic tire of claim 2, wherein the at least one foamed noise damper structure has a porosity ranging from about 20 to about 80 percent by volume.

10. The pneumatic tire of claim 1, wherein the at least one foamed noise damper structure has a density ranging from 0.35 to 0.8 g/cm$^3$.

11. The pneumatic tire of claim 1, wherein the at least one foamed noise damper structure further comprises an integral foamed structure extending circumferentially and radially inward from the carcass, and axially no more than 50 percent of the tread width.

12. The pneumatic tire of claim 1, wherein the at least one foamed noise damper structure extends axially in a range of from about 10 percent to 50 percent of the tread width.

13. The pneumatic tire of claim 1, wherein the at least one foamed noise damper structure is substantially centered axially on the axial centerline of the tire.

14. The pneumatic tire of claim 1, wherein the at least one foamed noise damper structure further comprises a plurality of foamed projections extending radially inward from the carcass.

15. The pneumatic tire of claim 1, wherein the at least one foamed noise damper structure further comprises a plurality of foamed projections extending radially inward from the carcass, the foamed projections selected from foamed rectangles, foamed cubes, foamed pyramids, foamed hemispheres, foamed cylinders, foamed cross hatching, foamed lettering, and foamed logos.

16. The pneumatic tire of claim 1, wherein the at least one foamed noise damper structure comprises a plurality of foamed projections extending radially inward from the carcass, the foamed projections together comprising a series of foamed ridges.

17. The pneumatic tire of claim 1, wherein the at least one foamed noise damper structure extends axially in a range of from about 20 percent to about 40 percent of the tread width.

18. The pneumatic tire of claim 1, further comprising a co-vulcanized innerliner layer disposed between the carcass and the at least one foamed noise damper structure.

19. The pneumatic tire of claim 1, wherein the at least one foamed noise damper structure has a porosity ranging from about 20 to about 80 percent by volume.

20. The pneumatic tire of claim 1, wherein the at least one foamed noise damper structure has a porosity ranging from about 30 to about 70 percent by volume.

* * * * *